United States Patent
Li et al.

(10) Patent No.: US 9,639,918 B2
(45) Date of Patent: May 2, 2017

(54) METHOD FOR ANTI-ALIASING OF IMAGE WITH SUPER-RESOLUTION

(71) Applicant: SHENZHEN CHINA STAR OPTOELECTRONICS TECHNOLOGY CO., LTD., Shenzhen, Guangdong (CN)

(72) Inventors: Hao Li, Shenzhen (CN); Houliang Hu, Shenzhen (CN); Li-Wei Chu, Shenzhen (CN); JhenWei He, Shenzhen (CN)

(73) Assignee: SHENZHEN CHINA STAR OPTOELECTRONICS TECHNOLOGY, Shenzhen (CN)

( * ) Notice: Subject to any disclaimer, the term of this patent is extended or adjusted under 35 U.S.C. 154(b) by 330 days.

(21) Appl. No.: 14/380,751

(22) PCT Filed: May 15, 2014

(86) PCT No.: PCT/CN2014/077523
§ 371 (c)(1),
(2) Date: Aug. 25, 2014

(87) PCT Pub. No.: WO2015/165132
PCT Pub. Date: Nov. 5, 2015

(65) Prior Publication Data
US 2016/0247262 A1    Aug. 25, 2016

(30) Foreign Application Priority Data

Apr. 28, 2014    (CN) .......................... 2014 1 0174632

(51) Int. Cl.
*G06K 9/40* (2006.01)
*G06T 5/00* (2006.01)
(Continued)

(52) U.S. Cl.
CPC .............. *G06T 5/002* (2013.01); *G06T 3/403* (2013.01); *G06T 3/4007* (2013.01);
(Continued)

(58) Field of Classification Search
None
See application file for complete search history.

(56) References Cited

U.S. PATENT DOCUMENTS

2003/0206667 A1\* 11/2003 Wang .................... G06T 7/0085
382/300
2006/0133698 A1\* 6/2006 Kim ........................ G06T 3/403
382/300
(Continued)

FOREIGN PATENT DOCUMENTS

CN    102547067 A    7/2012
CN    102750668 A    10/2012
(Continued)

OTHER PUBLICATIONS

Chen et al, A fast edge-oriented algorithm for image interpolation, Image and Vision Computing 23 (2005) 791-798.\*
(Continued)

*Primary Examiner* — Andrae S Allison
(74) *Attorney, Agent, or Firm* — Sughrue Mion, PLLC

(57) ABSTRACT

A method for image edge anti-aliasing with super-resolution is provided and used to achieve enlargement conversion from low resolution to high resolution, by applying the steps of: detecting a received image data and saving as an original edge pixel frame; enlarging the original edge pixel frame in double size along the horizontal and vertical directions, respectively; retaining the original edge pixel information; replacing pixels to be interpolated with a zero grayscale; and compensating the pixels to be interpolated which are temporarily replaced by the zero grayscale along edge directions
(Continued)

of the original edge pixel, such that the jagged phenomenon of output picture is output picture is significantly decreased, such that the jagged phenomena of an output picture is significantly decreased, with a detailed image information is well-maintained. The method is simple, with fewer calculations and faster operating speed, the cost can be effectively reduced.

28 Claims, 13 Drawing Sheets

(51) Int. Cl.
    *G06T 3/40*     (2006.01)
    *G06T 5/20*     (2006.01)
    *G06T 7/13*     (2017.01)

(52) U.S. Cl.
    CPC .............. *G06T 3/4053* (2013.01); *G06T 5/20* (2013.01); *G06T 7/13* (2017.01); *G06T 2207/10024* (2013.01); *G06T 2207/20192* (2013.01)

(56) References Cited

U.S. PATENT DOCUMENTS

| | | | | |
|---|---|---|---|---|
| 2008/0069239 | A1* | 3/2008 | Yan | H04N 19/33 375/240.21 |
| 2008/0165206 | A1* | 7/2008 | Wang | G06T 3/403 345/611 |
| 2013/0322780 | A1* | 12/2013 | Huang | H04N 19/172 382/269 |

FOREIGN PATENT DOCUMENTS

| | | |
|---|---|---|
| CN | 103034973 A | 4/2013 |
| CN | 103136723 A | 6/2013 |
| CN | 103617607 A | 3/2014 |

OTHER PUBLICATIONS

Ramesh Jain, Rangachar Kasturi, Brian G. Schunck, 1995 "Machine Vision Chapter 5", McGraw-Hill ,pp. 140-185.*

Bhatt et al Image Enhancement Using Various Interpolation Methods, IRACST—International Journal of Computer Science and Information Technology & Security (IJCSITS), ISSN: 2249-9555, vol. 2, No. 4, Aug. 2012.*

* cited by examiner

METHOD FOR ANTI-ALIASING OF IMAGE WITH SUPER-RESOLUTION

FIELD OF THE INVENTION

The present invention relates to a method of anti-aliasing of image with super-resolution, and in particular, to a compensation method of image interpolation.

BACKGROUND OF THE INVENTION

With the development of the information age, consumer electronics products have been spread all over every corner of human life. While the ever-changing consumer electronics products are always updated and replaced, people's requirements for visual effects are increasing. Image specifications of present display devices have progressed from standard definition (SD) to high-definition (HD) by improving the technology of image resolution. At present, an ultra-high-resolution algorithm has become a main solution of 4K2K flat display device, the ultra-high-resolution algorithm converts a low-resolution image or an image sequence into a high-resolution image, so as to improve picture quality. Image interpolation is one of the methods to improve the image resolution, for example: nearest neighbor interpolation method, bilinear interpolation method, or bicubic interpolation method, and the like.

However, these conventional image interpolation methods simply enlarge images, but ignore information changes between high-frequency and low-frequency, such that the image will become blurred with the increase of the enlargement ratio. Besides, in consideration of human eyes being more sensitive to high-frequency information (image edges), the computing consumption of the edge interpolation method applied for saving original edge information during the enlargement process is still high. It is very difficult to meet the needs of some practical applications, thus causing increased costs and poor utility.

Thus, the present invention provides an image edge anti-aliasing method with super high-resolution, which is configured to achieve enlarging conversion from low-resolution to high resolution, such that it can eliminate the jagged edges of an image, so as to prevent the image edges from becoming blurred, and to reduce the computational requirements of the system. The present invention has several advantages: the liquid crystal display has a simple algorithm system, the operating speed is fast, and the cost can be effectively reduced, and so on.

SUMMARY OF THE INVENTION

The objectives of the present invention are to remove the jagged edges of images, to enhance the contrast of the edge contour, to keep the detailed image information, and to reduce the cost of the system effectively.

To achieve the foregoing objectives of the present invention, the present invention provides method of anti-aliasing of an image with super-resolution, comprising the steps of:

Step (1) adopting Canny edge detection to detect edges of an image and saving the edges as an original edge pixel frame, in particular, smoothing the image edges by using a Gaussian filter, calculating a gradient magnitude and a gradient direction of the edges by applying a first-order partial derivative of the finite difference, adopting a non-maxima suppression to the gradient magnitude of the edges, and applying a dual-threshold algorithm to detect and connect the edges.

Step (2) enlarging the original edge pixel frame to form a 2×2 enlarged pixel frame, retaining all of the information of the edge pixels of the original edge pixel frame; the additional pixels of the enlarged pixel frame caused by the enlargement are the pixels to be interpolated.

Step (3) replacing the pixels to be interpolated with a zero grayscale.

Step (4) compensating the pixels to be interpolated which are temporarily replaced by the zero grayscale along the edge directions of the retained original edge pixels in the enlarged pixel frame, in particular, dividing the edge pixels detected on the basis of step (1) into a plurality of 4×4 pixels, and determining whether there is a special edge within the 4×4 pixel, if so, applying a corresponding 4×4 interpolation rule to calculate; if not, determining whether there is a 2×2 universal edge within the 4×4 pixel, if so, applying a 2×2 common interpolation rule to compensate the zero grayscale pixels, if the above two edges do not exist, then applying a double-cubic interpolation algorithm to compensate the interpolation of the zero grayscale pixels.

The 4×4 interpolation rule is for determining an edge direction of the 4×4 pixel, and interpolating along the edge direction based on a center point of the 4×4 pixel, the interpolations of the top point and the left point of the center point are simultaneously compensated.

The 2×2 common interpolation rule is for determining the edge direction of only four pixel points in the center of the 4×4 pixel, and interpolating along the edge direction based on the center point of the 4×4 pixel, the interpolations of the top point and the left point of the center point are simultaneously compensated.

During the compensation for interpolating of the center point of the 4×4 pixel, the top point and the left point of the center point are determined by the four pixel points in the center of the 4×4 pixel.

According to another aspect of the present invention, the present invention provides method of anti-aliasing of an image with super-resolution, comprising the steps of: step (1) detecting edges of an image and saving the edges as an original edge pixel frame. The detected edges have the advantages of: high noise ratio, high accuracy positioning, single-edge response, closure, etc., so that the image edge anti-aliasing method can process an optimal edge detection for complicated images.

Step (2) enlarging the original edge pixel frame to form a 2×2 enlarged pixel frame, retaining all of the information of the edge pixels of the original edge pixel frame; the additional pixels of the enlarged pixel frame caused by the enlargement are the pixels to be interpolated.

Step (3) replacing the pixels to be interpolated with a zero grayscale. The process can ensure the resolution and integrity of the edge contour, so as to enhance the image contrast without sacrificing the image quality.

Step (4) compensating the pixels to be interpolated which are temporarily replaced by the zero grayscale along the edge directions of the retained original edge pixels in the enlarged pixel frame and taking the impacts of the edge pixels and information of the neighboring pixels into consideration, such that the jagged phenomena of an output picture is significantly decreased, with a detailed image information is well-maintained.

The ultra-high-resolution algorithm of the present invention is configured to achieve the enlargement conversion from low resolution to high resolution. The algorithm is simple and uses less calculations, resulting in faster system operation and can effectively reduce costs.

Step (1) above comprises specific steps of: (1-1) smoothing the image edges by using a Gaussian filter; (1-2) calculating a gradient magnitude and a gradient direction of the edges by applying a first-order partial derivative of the finite difference; (1-3) adopting an non-maxima suppression to the gradient magnitude of the edges; and (1-4) applying a dual-threshold algorithm to detect and connect the edges.

Step (2) is a method of edge enlargement, which directly enlarges the original edge pixel frame to form a 2×2 enlarged pixel frame, and retains all of the information of the edge pixels of the original edge pixel frame, and replaces the pixels to be interpolated with a zero grayscale. In step (3), the edge type is determined by interpolation process to compensate the edge image for solving a jagged image problem instead of smoothing the edge image, such that the resolution of the edge contour can be guaranteed. The interpolation process will be decried later on in the present invention.

Step (4) is, in particular: dividing the edge pixels detected on the basis of step (1) into a plurality of 4×4 pixels. Each of the 4×4 pixels is divided into 4×4 special edges, 2×2 universal edges, and other edges.

Taking the pixel to be interpolated as a center, and determining whether there is a special edge within the 4×4 pixel. If so, applying a corresponding 4×4 interpolation rule to calculate. If not, then determining whether there is a 2×2 universal edge within the 4×4 pixel; if so, applying a 2×2 common interpolation rule to compensate the zero grayscale pixels. If the above two edges do not exist, then applying a double-cubic interpolation algorithm to compensate the interpolation of the pixels, so that the contrast of the edge contour can be enhanced, and the detailed image information is well-maintained.

In order to improve the interpolation accuracy of the edge direction, the present invention determines an edge direction of the 4×4 pixel, and derives the interpolation value along the edge direction based on a center point, the interpolations of the top point and the left point of the center point are simultaneously compensated. The compensation for interpolating of the top point and the left point of the center point are determined by the four pixel points in the center of the 4×4 pixel.

For a better understanding of the aforementioned content of the present invention, preferable embodiments are illustrated in accordance with the attached figures as follows:

DETAILED DESCRIPTION OF THE PREFERRED EMBODIMENTS

Figure 1:
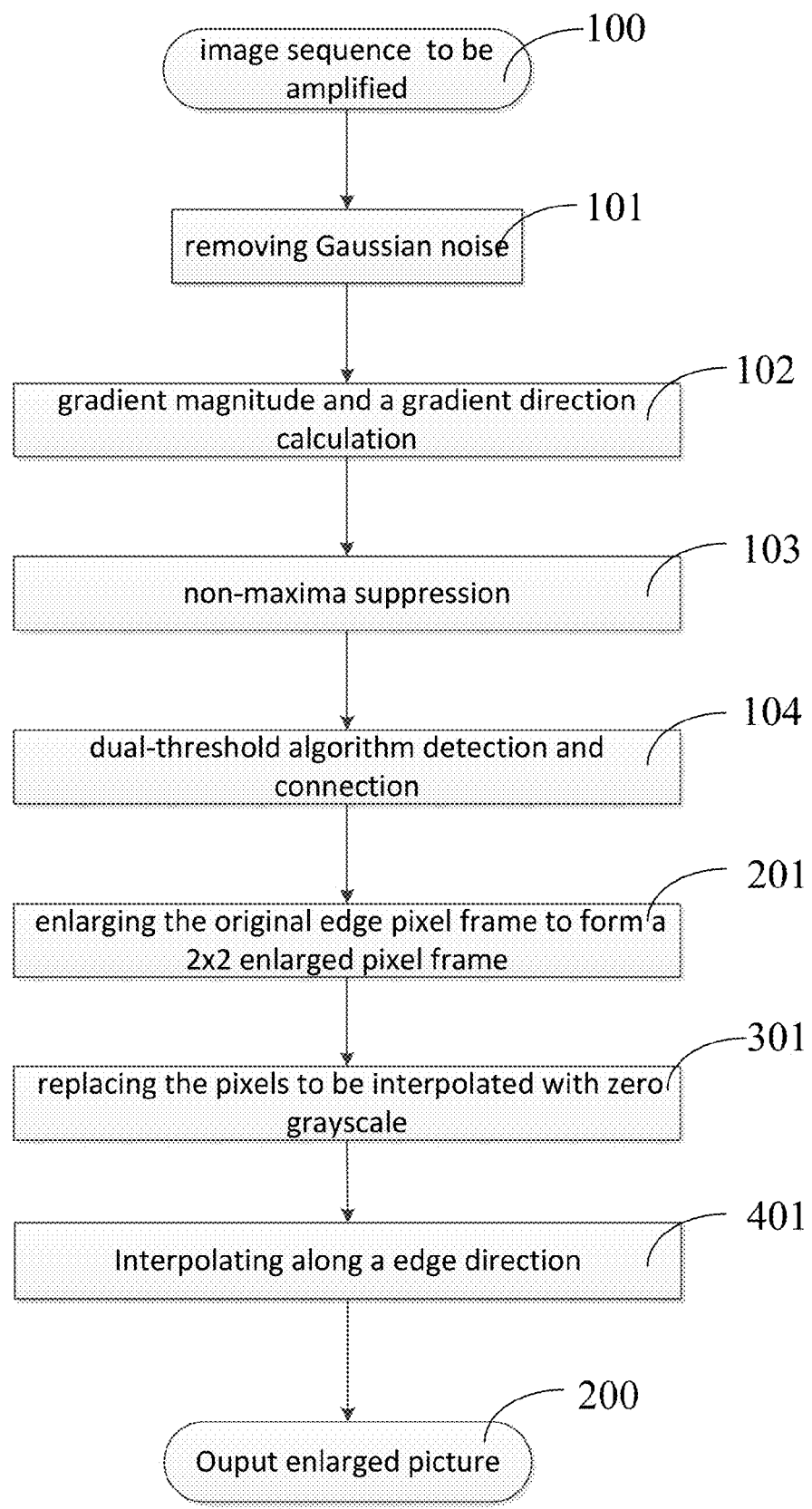
FIG. 1 is a flowchart of a super-resolution algorithm of the present invention.

FIG. 1 is a flow chart of method of anti-aliasing an image with super-resolution algorithm of the present invention, which comprises the steps of: step 101, removing Gaussian noise; Step 102, calculating the gradient magnitude and a gradient direction; Step 103, non-maxima suppression; step 104, detecting and connecting edges by applying a dual-threshold algorithm; step 201, enlarging the original edge pixel frame to form a 2×2 enlarged pixel frame; step 301, replacing the interpolated pixels with a zero grayscale; and step 401, interpolating along the edge direction.

The above steps 101 to 104 are commonly known as the Canny edge detection method, which detects image edges and saves the edges as an original edge pixel frame, specifically as follows: An image sequence 100 to be amplified is smoothed by removing Gaussian noise by the Gaussian filter 101, where the raw data is convolved with Gaussian smoothing mode.

The filter used herein will directly affect the result of the calculation in step 101. The blur effect made from a smaller filter is less generated, so a smaller thread with obvious change can be detected. A bigger filter generates more blur, so it is suitable for detecting lager and smoother edges.

The convolution of the smoothed image sequence 100 with the Gaussian smoothing filter may be as follows:

$$g(x,y)=h(x,y,\sigma)*f(x,y),$$

Where g (x, y) is the smoothed image sequence 100 and f (x, y) is the image before smoothing.

In addition, because the edges of the image may have different directions, in step 102 a first-order partial derivative of the finite difference is applied to calculate a gradient magnitude and a gradient direction.

In this step, applying the first-order partial derivatives of the finite difference to calculate partial derivative array P and Q. Two arrays of x and y partial derivatives of the gradient g (x, y) of the smoothed image can be calculated by 2×2 first-order finite difference approximation, where $$P(x,y) \approx [g(x,y+1)-g(x,y)+g(x+1,y+1)-g(x+1,y)]/2;$$

$$Q(x,y) \approx [g(x,y)-g(x+1,y)+g(x,y+1)-g(x+1,y+1)]/2.$$

Amplitude and azimuth can be calculated by applying a Cartesian to polar coordinates conversion formula:

$$M(x,y)=[P(x,y)^2+Q(x,y)^2]^{1/2}$$

$$\theta(x,y)=\tan^{-1}[Q(x,y)/P(x,y)]$$

Where, M(x, y) represents image edge intensity and θ (x, y) represents edge direction.

In step 103, the edge gradient magnitude is suppressed by non-maxima suppression (NMS). In order to confirm the edge, the maximum point of the local edge gradient must be retained for the non-maximum suppression.

Non-maxima suppression is achieved by suppressing all magnitudes of non-ridge peaks of the edge gradient lines to refine the edge ridges in the gradient magnitude of M (x, y). The direction angle and magnitude of the edge ridges are:

$$\zeta(x,y)=\text{Selector}[\theta(x,y)];$$

$$N(x,y)=\text{NMS}[M(x,y),\zeta(x,y)].$$

Furthermore, in step 104, an image edge is detected using a dual-threshold algorithm and connecting the edges, and the detected image edges are saved as an original edge pixel frame. In the dual-threshold algorithm, the threshold of the edges images N1(x, y) and N2(x, y) are obtained by using two thresholds τ1 and τ2 (2τ1≈τ2).

Since N2 (x, y) is a high threshold, there are few previously fake edges which connect together to form a contour in N2(x, y). When the end of the contour is reached, the neighboring point of N1(x, y) can be searched to connect to the edge of the contour. In this way, the edge is continuously collected from N1(x, y) until it is connected to N2(x, y).

The above Canny edge detection method aims to find an optimal edge detection algorithm, and the advantages of the detected image edge are high signal-to-noise ratio, high positioning accuracy, single-edge response, closure, etc., such that it can process an optimal edge detection optimal for complicated images.

Figure 2:
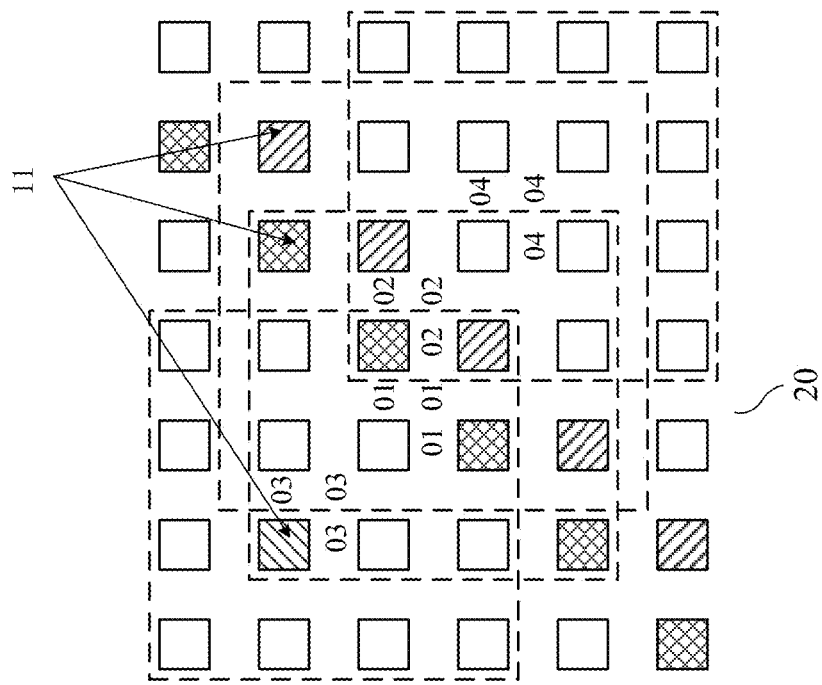
FIG. 2 is a schematic diagram of an enlarged edge pixel frame of the present invention.
Figure 2:
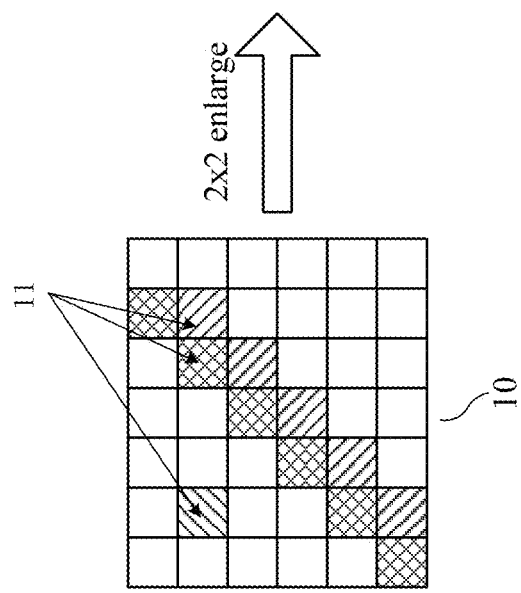

Continue to refer to step 201 in FIG. 1 when finishing steps 101 to 104. Referring to FIG. 2, step 201 is a method of edge enlargement. In step 201, the original edge pixel frame 10 is enlarged to form a 2×2 enlarged pixel frame 20 and all of the information of the edge pixels of the original edge pixel frame 10 is retained. The additional pixels of the enlarged pixel frame 20 caused by the enlargement are the pixels to be interpolated. Moreover, the pixels to be interpolated are replaced by the zero grayscale.

In FIG. 2, an blank between two pixels is the pixel to be interpolated, which is temporarily replaced by the zero grayscale. This step can further be compensated through Step 401 by determining the edge type for solving the jagged image problem, instead of smoothing the edge pixels, so that the resolution and completeness of the edge contours can be guaranteed, enhancing the image contrast without sacrificing the quality.

Step 401 is a pixel compensation method. The pixels to be interpolated 01, 02, 03, and 04, which are temporarily replaced by the zero grayscale using a special interpolation rule, are compensated along the edge direction of the retained original edge pixel 11 in the enlarged pixel frame 20, and considering the effects of the edge pixel and peripheral pixel information (4×4 original pixels), such that the jagged phenomena of the output picture is significantly decreased, with a detailed image information is well-maintained.

In particular, in step 401, the edge pixels detected by the Canny edge detection method from the above steps 101 to 104 are divided into a plurality of 4×4 pixels each having 4×4 special edges, 2×2 universal edges, and other edges respectively. The special edges are calculated by a 4×4 interpolation rule. The universal edges are calculated by a 2×2 interpolation rule. The other edges are calculated by a double-cubic interpolation algorithm.

In particular, taking the pixel to be interpolated as a center. First, determining whether there is a special edge within the 4×4 pixel, if so, applying a corresponding 4×4 interpolation rule to calculate, and if not, determining whether there is a universal edge within the 4×4 pixel; if so, applying a 2×2 common interpolation rule to compensate the interpolation of the pixels. If the above two edges do not exist, then applying a double-cubic interpolation algorithm to compensate the interpolation of the pixels.

For example: in FIG. 2, blanks 01 and 02 belong to the 4×4 special edge using the 4×4 interpolated rule; blank 03 belongs to the 2×2 universal edge, and is therefore using the 2×2 interpolated rule; blank 04 belongs to neither the 4×4 special edge nor the 2×2 universal edge, and so the double-cubic interpolation algorithm is used for calculation. Therefore, the contrast of the edge pixels is accurately enhanced, and the detailed image information is well-maintained. Through the above steps 101 to 401, the output of the amplified image 200 is completed.

Figure 3:
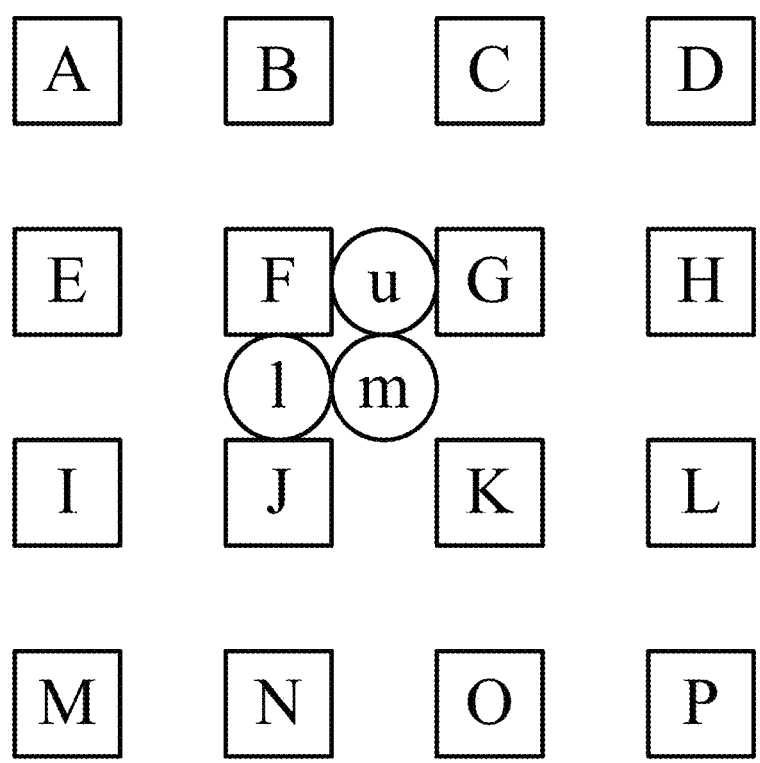
FIG. 3 is a schematic diagram of a pixel to be interpolated of the present invention.

Referring to FIG. 3, for descriptive convenience, a pixel coordinate of a pixel located in lower left corner of the 4×4 pixel is defined as (0, 0), and a pixel coordinate of a pixel located in upper right corner is defined as (3a, 3b), a represents a unit length in the direction of the X-axis and b represents a unit length in the direction of the Y-axis. Where, for a=1, b=1, the pixel code of each pixel coordinate in FIGS. 3 to 11 is represented in the following Table 1, but it is not limited thereto.

Where A, B, C, D, E, F, G, H, I, J, K, L, M, N, O, and P are the original pixels, and m, u, and l are the center point, the top point, and the left point of the pixels to be interpolated. In order to improve the accuracy of the interpolation of the edge direction, in the present invention the interpolation is to determine the edge direction of the 4×4 pixel by using the above rules for calculating pixel values of the pixel to be interpolated of the center point m, the top of the center point u, and the left of the center point l.

TABLE 1

| Pixel coordinate | Pixel Code |
| --- | --- |
| (0, 3b) | A |
| (a, 3b) | B |
| (2a, 3b) | C |
| (3a, 3b) | D |
| (0, 2b) | E |
| (a, 2b) | F |
| (2a, 2b) | G |
| (3a, 2b) | H |
| (0, b) | I |
| (a, b) | J |
| (2a, b) | K |
| (3a, b) | L |
| (0, 0) | M |
| (a, 0) | N |
| (2a, 0) | O |
| (3a, 0) | P |

In particular, the 4×4 special edges and the corresponding interpolated rule of the present invention are: the different kinds of the special edges are divided in accordance with the angle from small to large for rotating a circle. Based on the center point m of the 4×4 pixel along the edge direction, the interpolation is performed. The interpolations of the top point u and the left point l are simultaneously compensated, wherein the compensation of the center point m, the top point u, and the left point l of the 4×4 pixel are determined by the four pixel points F, G, J, K in the center of the 4×4 pixel.

Figure 4:
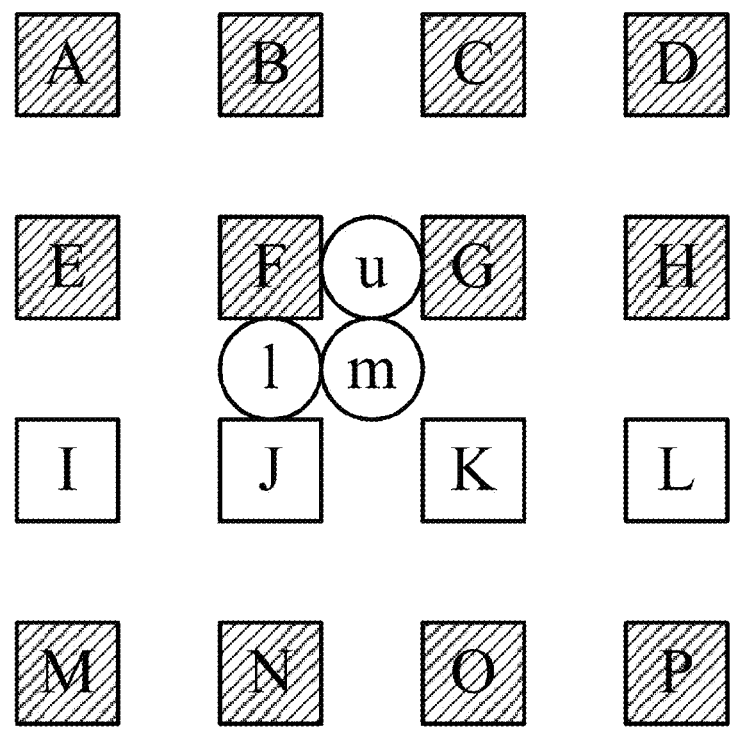
FIGS. 4(a)-4(b) are first schematic diagrams of each of the 4×4 special edges and the corresponding interpolation rules of the present invention.
Figure 4:
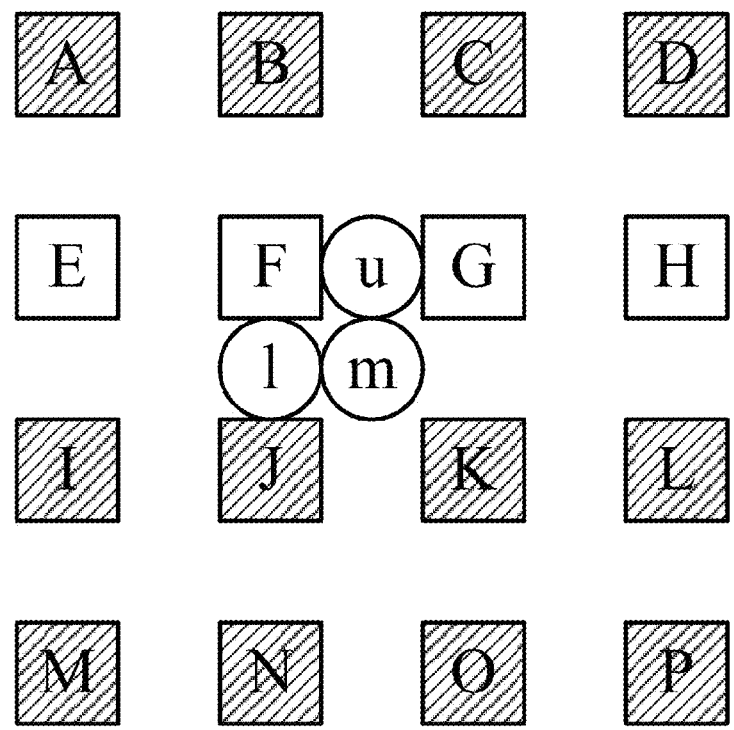

In the first case shown in FIG. 4, wherein I, J, K, L, and E, F, G, H are respectively detected as edge pixels; m, u, l are the center point, the top point, and the left point of the pixel to be interpolated.

Referring to FIG. 4(a), a pixel value of m is calculated by bicubic interpolation of four pixel points I, J, K, and L, a pixel value of l is equal to that of the pixel J, and a pixel value of u is equal to an average value of the pixels F and G. In addition, in FIG. 4(b), a pixel value of u is calculated by the bicubic interpolation of four pixel points E, F, G, H, a pixel value of l is equal to that of the pixel J, and a pixel value of m is equal to an average value of the pixels J and K.

Figure 5:
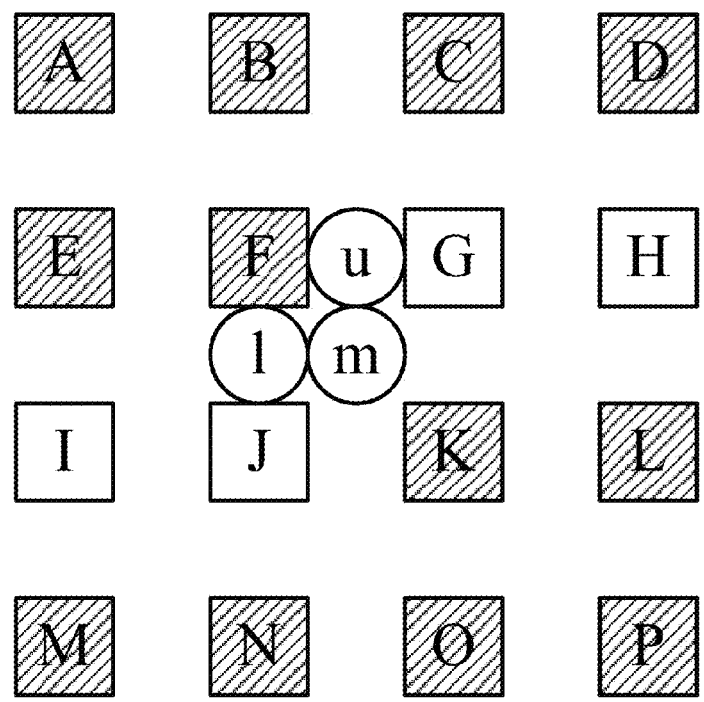
FIGS. 5(a)-5(b) are second schematic diagrams of each of the 4×4 special edges and the corresponding interpolation rules of the present invention.
Figure 5:
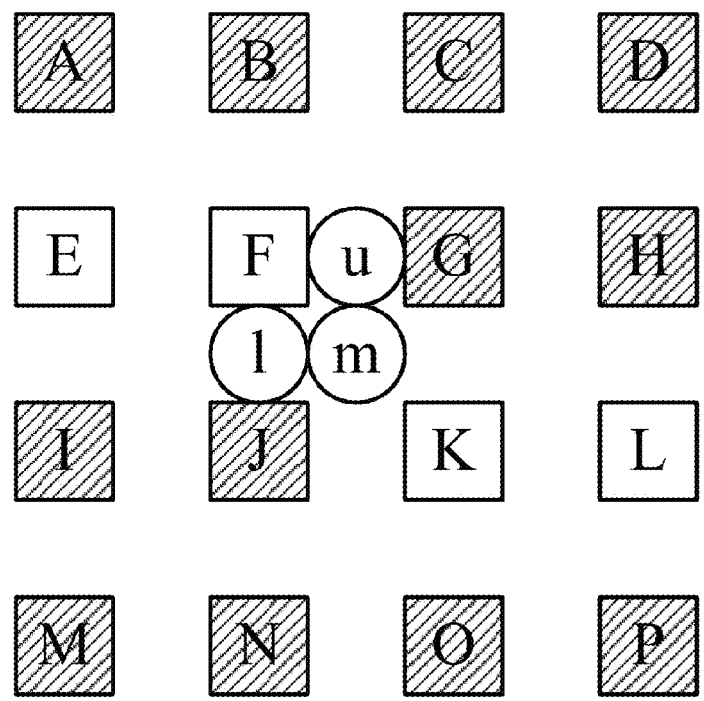

The second case of the 4×4 special edge is shown in FIG. 5, wherein I, J, G, H, and E, F, K, L are respectively detected as edge pixels; m, u, and l are the center point, the top point, and the left point of the pixels to be interpolated. Referring to FIG. 5(a), wherein a pixel value of m is equal to an average value of the pixels J and K, a pixel value of l is equal to that of the pixel J, and a pixel value of u is equal to that of the pixel G. In FIG. 5(b), a pixel value of m is equal to an average value of the pixels J and K, a pixel value of l is equal to that of the pixel J, and a pixel value of u is equal to that of the pixel F.

Figure 6:
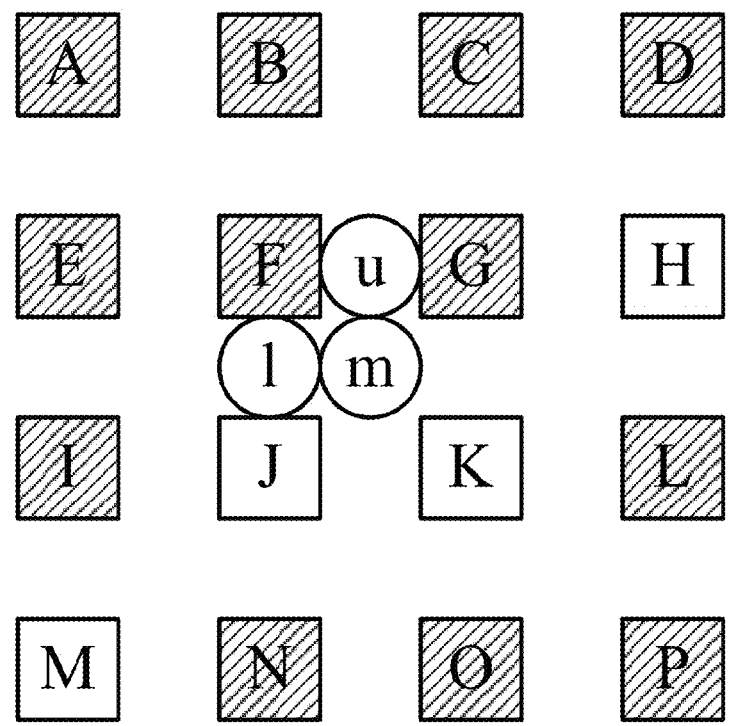
FIGS. 6(a)-6(d) are third schematic diagrams of each of the 4×4 special edges and the corresponding interpolation rules of the present invention.
Figure 6:
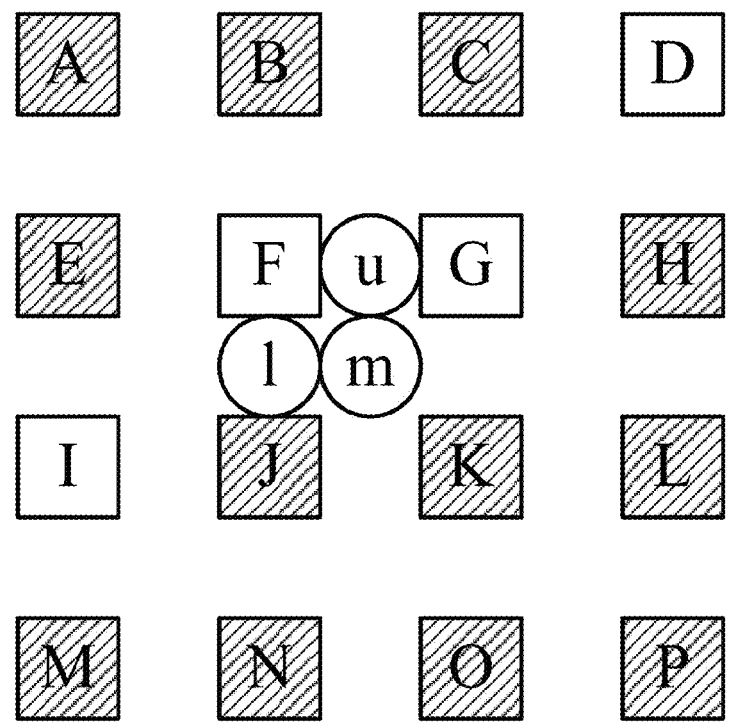
Figure 6:
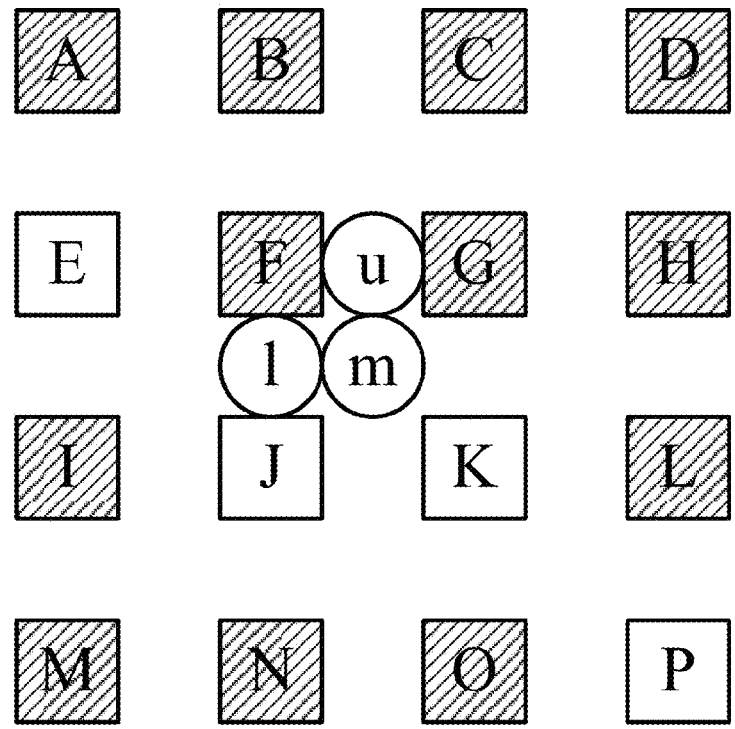
Figure 6:
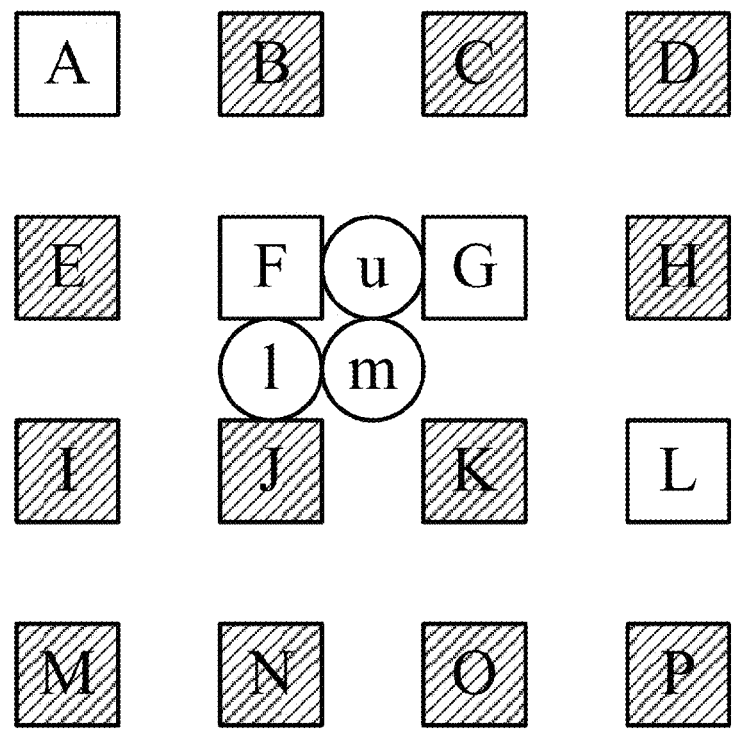

The third case of the 4×4 special edge is shown in FIG. 6, wherein M, J, K, H, and I, F, G, D are respectively detected as edge pixels. m, u, and l are the center point, the top point, and the left point of the pixel to be interpolated. Referring to FIG. 6(a)~6(d), wherein a pixel value of m is equal to an average value of the pixels J and K, a pixel value of l is equal to an average value of the pixels F and J, and a pixel value u is equal to an average value of the pixels F and G.

Figure 7:
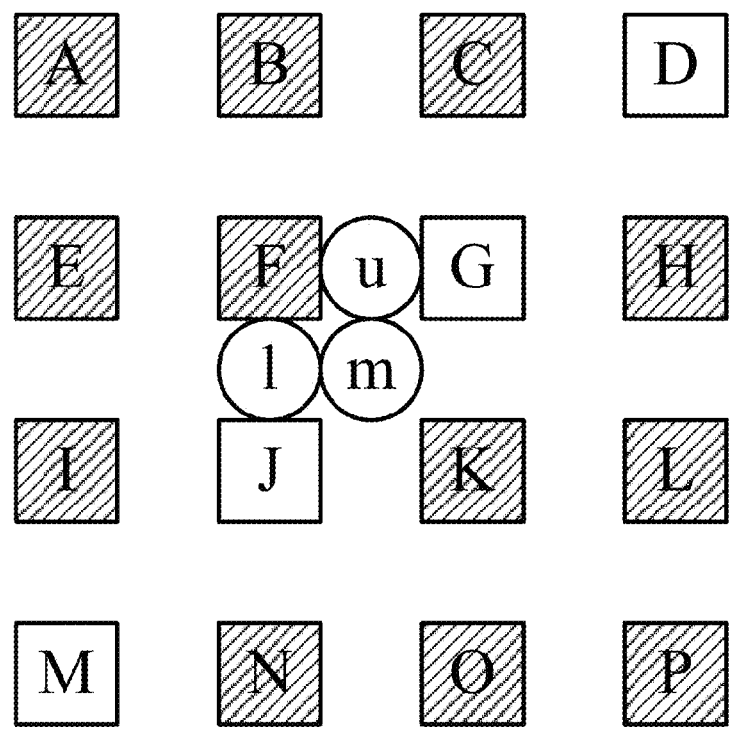
FIGS. 7(a)-7(b) are fourth schematic diagrams of each of the 4×4 special edges and the corresponding interpolation rules of the present invention.
Figure 7:
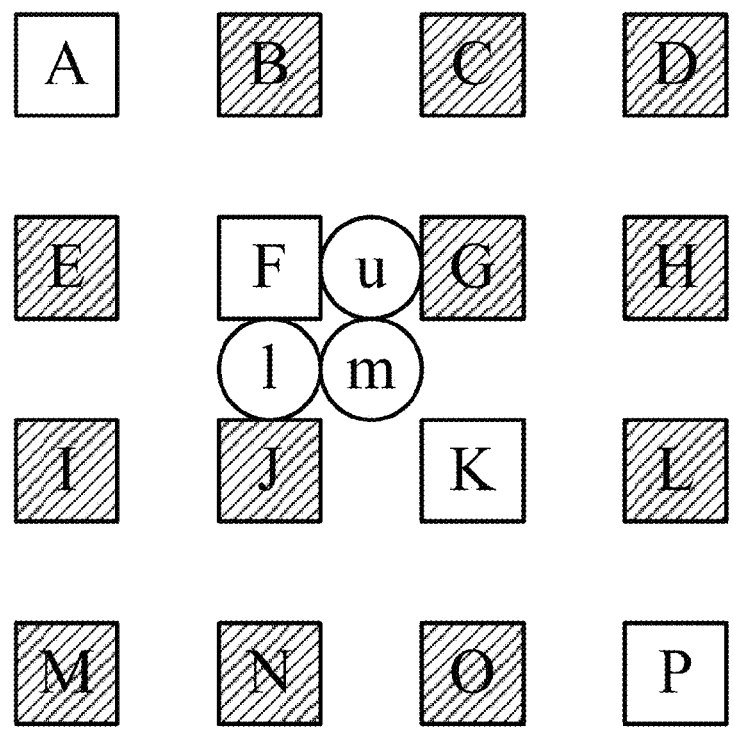

The forth case of the 4×4 special edge is shown in FIG. 7, wherein M, J, G, D, and A, F, K, P are respectively detected as edge pixels. m, u, and l are the center point, the top point, and the left point of the pixel to be interpolated. Referring to FIG. 7(a), wherein a pixel value of m is calculated by bicubic interpolation of four pixel points M, J, G, and D. A pixel value of l is equal to an average value of the pixels F and J, and a pixel value of u is equal to an average value of the pixels F and G. While in FIG. 7(b), a pixel value of m is calculated by the bicubic interpolation of four pixel points A, F, K, and P. A pixel value of l is equal to an average value of the pixels F and J, and a pixel value of u is equal to an average value of the pixels F and G.

Figure 8:
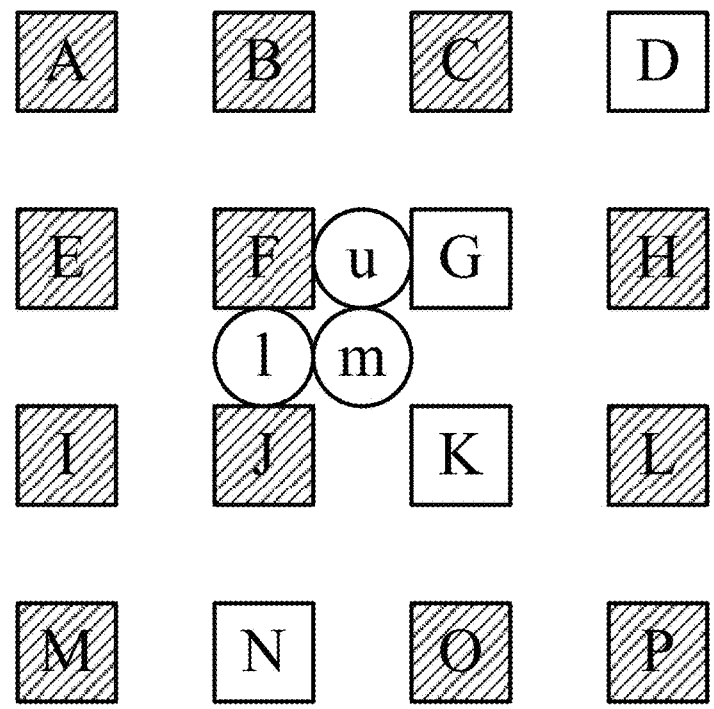
FIGS. 8(a)-8(b) are fifth schematic diagrams of each of the 4×4 special edges and the corresponding interpolation rules of the present invention.
Figure 8:
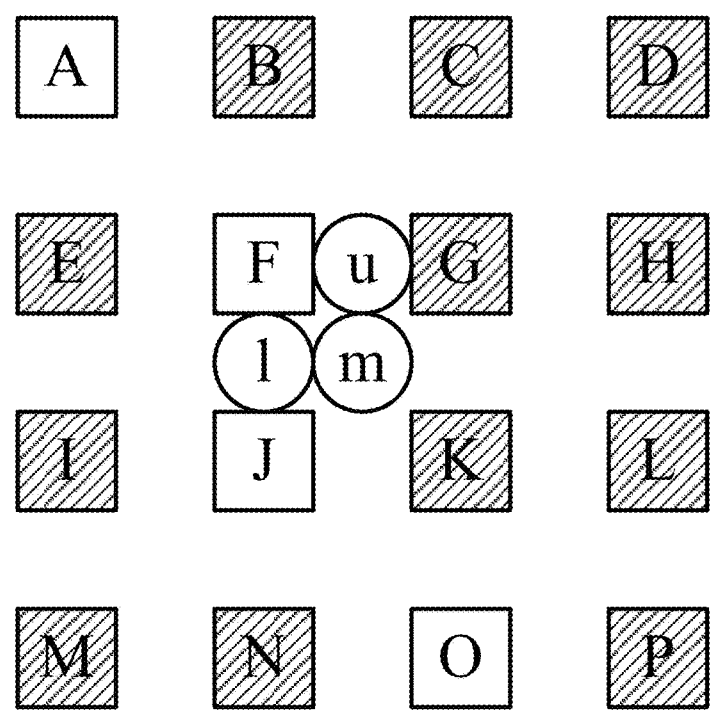

The fifth case of the 4×4 special edge is shown in FIG. 8, wherein N, K, G, D, and A, F, J, O are respectively detected as edge pixels. m, u, and l are the center point, the top point, and the left point of the pixel to be interpolated. Referring to FIGS. 8(a) and 8(b), wherein a pixel value of m is equal to an average value of the pixels F and J, a pixel value of l is equal to an average value of the pixels F and J, and a pixel value of u is equal to that of the pixel F.

Figure 9:
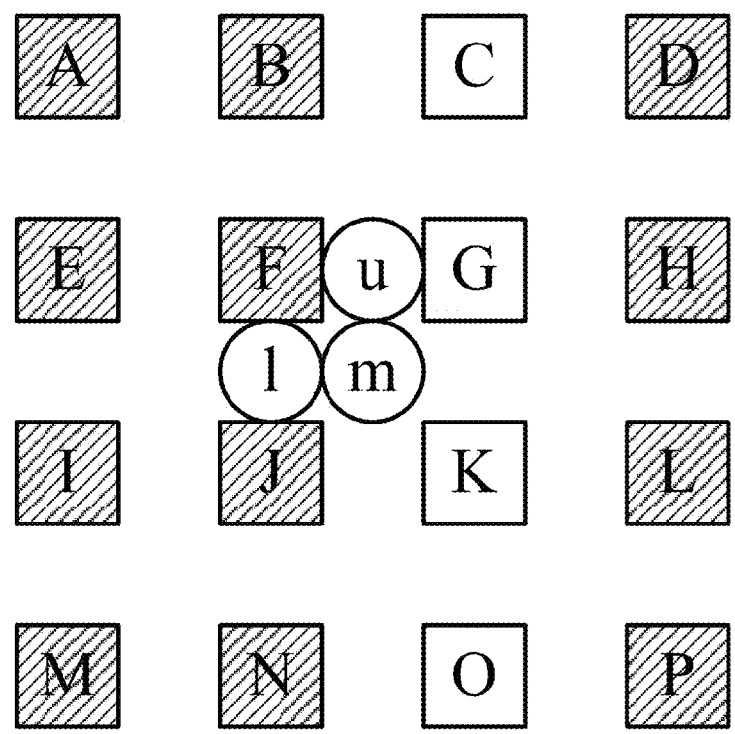
FIGS. 9(a)-9(b) are sixth schematic diagrams of each of the 4×4 special edges and the corresponding interpolation rules of the present invention.
Figure 9:
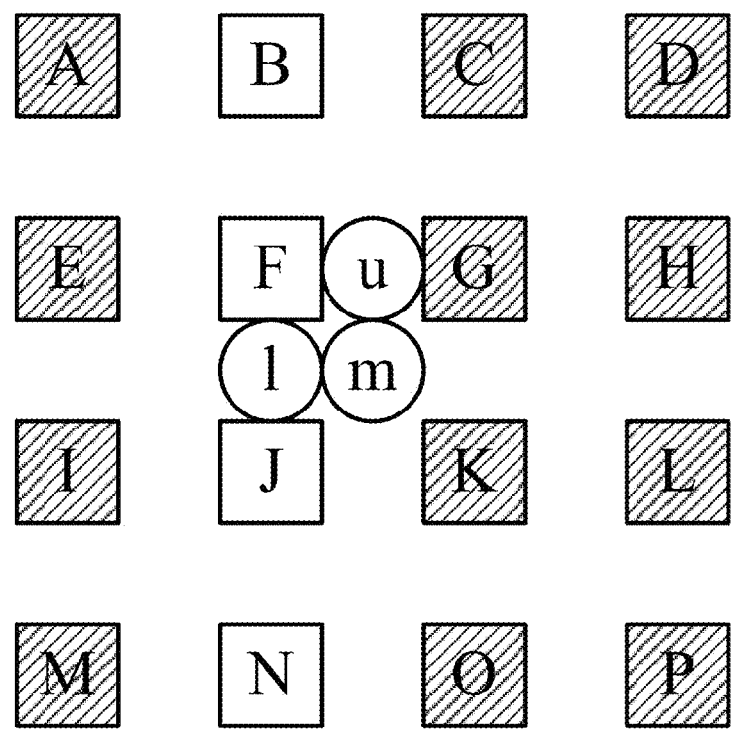
Figure 10:
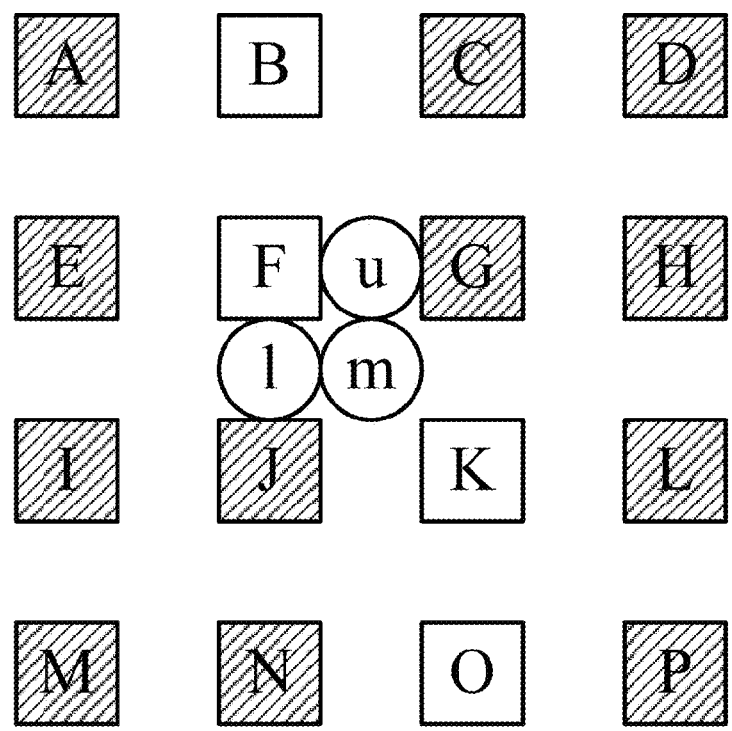
FIGS. 10(a)-10(b) are seventh schematic diagrams of each of the 4×4 special edges and the corresponding interpolation rules of the present invention.
Figure 10:
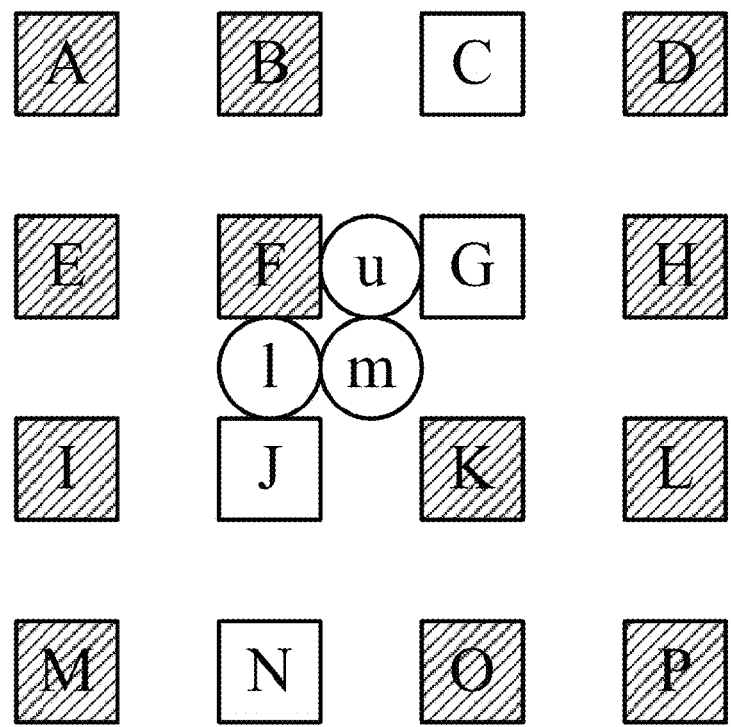

The sixth case of the 4×4 special edge is shown in FIG. 9, wherein C, G, K, O, and B, F, J, N are respectively detected as edge pixels. m, u, and l are the center point, the upper point, and the left point of the pixel to be interpolated. Referring to FIG. 9(a), wherein a pixel value of m is calculated by bicubic interpolation of four pixel points C, G, K, and O. A pixel value of l is equal to an average value of the pixels F and J, and a pixel value of u is equal to that of the pixel F. While in FIG. 9(b), a pixel value of l is calculated by bicubic interpolation of four pixel points B, F, J, and N. A pixel value of m is equal to an average value of the pixels F and J, and a pixel value of u is equal to that of the pixel F.

The seventh case of the 4×4 special edge is shown in FIG. 7, wherein B, F, K, O, and C, G, J, N are respectively detected as edge pixels. m, u, and l are the center point, the top point, and the left point of the pixel to be interpolated. Referring to FIGS. 10(a) and 10(b), wherein a pixel value of m is equal to an average value of the pixels F and J, a pixel value l is equal to an average value of the pixels F and J, and a pixel value of u is equal to that of the pixel F.

Figure 11:
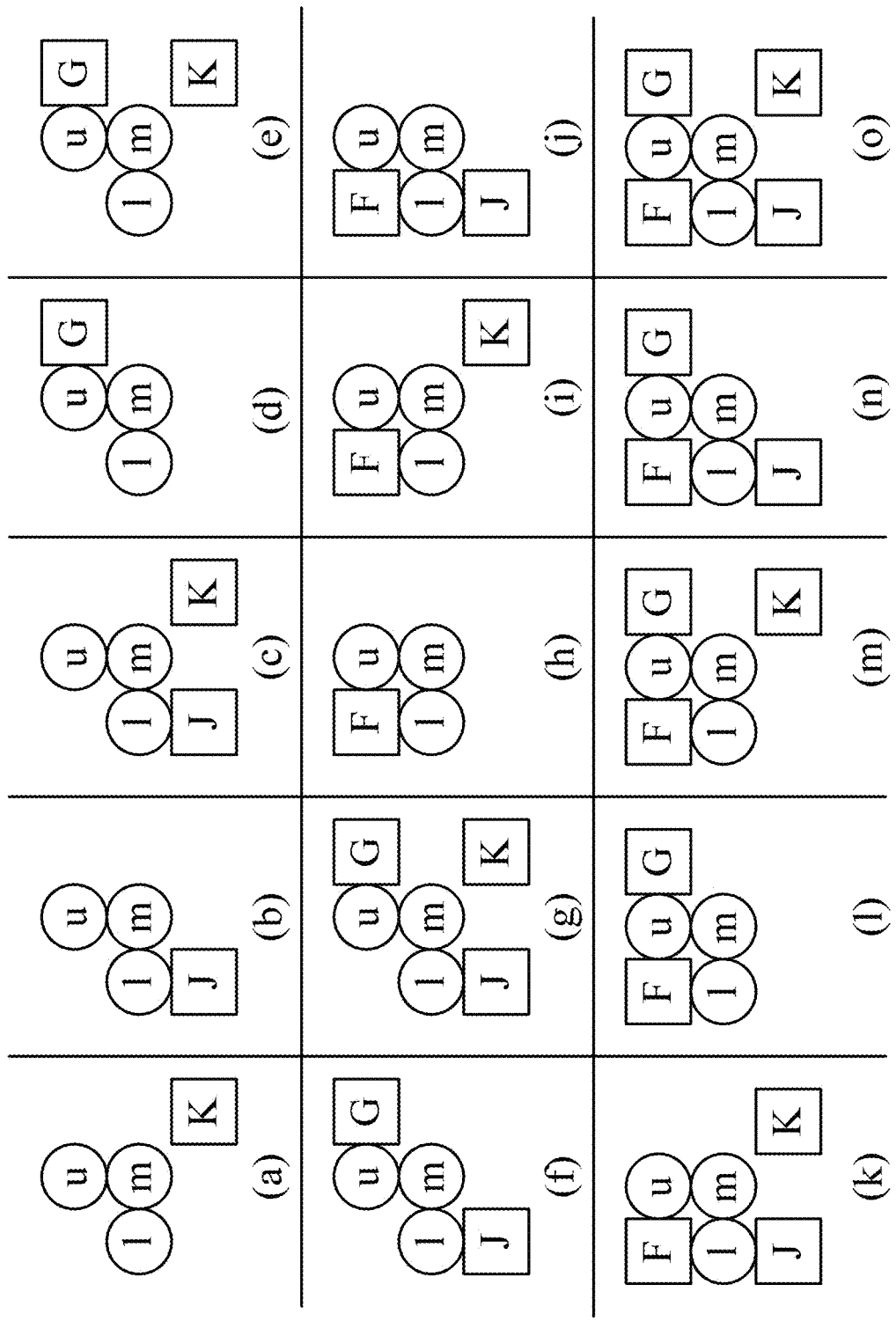
FIGS. 11(a)-11(o) are schematic diagrams of a 2×2 universal edge and the corresponding interpolation rule of the present invention.

FIG. 11 illustrates the 2×2 universal edges of the present invention. Compared with the interpolation rule of the 4×4 special edge, the 2×2 common interpolated rule only detects if four pixels F, G, J, and K, which are edge pixels in the center of the 4×4 pixel, but does not consider other pixels.

FIG. 11 does not illustrate the pixels A, B, C, D, E, H, I, L, M, N, O, and P, instead using an omissive representation. In order to improve the accuracy of interpolation of the edge direction, rotate from small to large angle of a circle to differentiate types of the special edges. The edge direction of the pixels F, G, J, and K is determined. Along the edge direction and on the basis of the center point m of the pixels F, G, J, and K, the interpolation is performed. The interpolations of the top point u and the left point l are simultaneously compensated, wherein the compensation for interpolating of the center point m, the top point u, and the left point l of the 4×4 pixel are determined by the four pixel points F, G, J, and K. The interpolation rules are respectively as follows:

As shown in FIG. 11(a), when K is detected as the edge pixel, a pixel value of m and l are equal to an average value of pixels F and J, and a pixel value of u is equal to an average value of pixels F and G.

As shown in FIG. 11(b), when J is detected as the edge pixel, m and l are equal to an average value of pixels G and K, a pixel value of l is equal to that of pixel F, and a pixel value of u is equal to an average value of the pixels F and G.

As shown in FIG. 11(c), when J and K are detected as the edge pixels, a pixel value of m is equal to an average value of the pixels J and K, a pixel value of l is equal to that of the pixel J, and a pixel value of u is equal to an average value of pixels F and G.

As shown in FIG. 11(d), when G is detected as the edge pixel, a pixel value m is equal to an average value of pixels J and K, a pixel value of l is equal to that of the pixel J, and a pixel value of u is equal to that of pixel F.

As shown in FIG. 11(e), when G and K are detected as the edge pixels, a pixel value of m and l is equal to an average value of pixels F and J, and a pixel value of u is equal to that of the pixel F.

As shown in FIGS. 11(f) and 11(g), when G, J or G, J, K are detected as the edge pixels, a pixel value of m is equal to an average value of the pixels J and G, and a pixel value of l and u is equal to that of pixel F.

As shown in FIG. 11(h), when F is detected as the edge pixel, a pixel value of m is equal to an average value of pixels J and K, a pixel value of l is equal to that of the pixel J, and a pixel value of u is equal to that of pixel G.

As shown in FIG. 11(i), when F and K are detected as the edge pixels, a pixel value of m is equal to an average value of the pixels F and K, a pixel value of l is equal to that of pixel J, and a pixel value of u is equal to that of pixel G.

As shown in FIG. 11(j), when F and J are detected as the edge pixels, a pixel value of m is equal to an average value of pixels G and K, a pixel value of l is equal to an average value of the pixels F and J, and a pixel value of u is equal to that of the pixel G.

As shown in FIG. 11(k), when F, J, and K are detected as the edge pixels, a pixel value of m is an average value of the pixels F and K, a pixel value of l is equal to an average value of the pixels F and J, and a pixel value of u is equal to that of pixel G.

As shown in FIG. 11(*l*), when F and G are detected as the edge pixels, a pixel value of m is equal to an average value of pixels J and K, a pixel value of 1 is equal to that of pixel J, and a pixel value of u is equal to an average value of the pixels F and G.

As shown in FIG. 11(*m*), when F, G, and K are detected as the edge pixels, a pixel value of m is equal to an average value of the pixels F and K, a pixel value of 1 is equal to that of pixel J, and a pixel value of u is equal to an average value of the pixels F and G.

As shown in FIG. 11(*n*), when F, G and J are detected as the edge pixels, a pixel value of m is equal to an average value of the pixels G and J, a pixel value of 1 is equal to an average value of the pixels F and J, and a pixel value of u is equal to an average value of the pixels F and G.

As shown in FIG. 11(*o*), when F, G, J and K are detected as the edge pixels, a pixel value of m is equal to an average value of the pixels F, G, J and K, a pixel value of 1 is equal to an average value of the pixels F and J, and a pixel value of u is equal to an average value of the pixels F and G.

Figure 12:
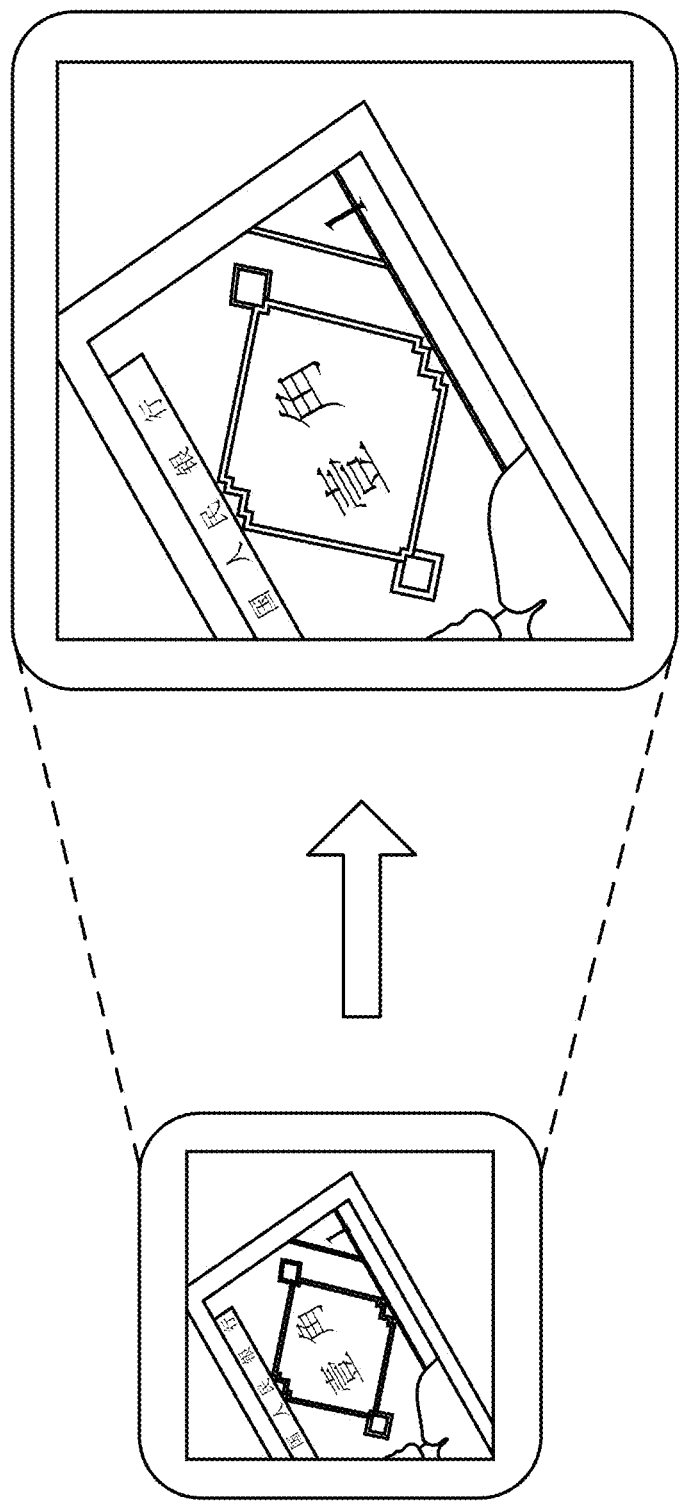
FIG. 12 is a schematic diagram of a software simulation result of the present invention.

By the above mentioned method, the 4×4 special edges and 2×2 universal edges are determined. Moreover, a method of anti-aliasing of an image with super-resolution is completed by the corresponding interpolation rule. A software simulation result is shown in FIG. 12. A new algorithm provided by the present invention will eliminate the jagged edges of the image, and have better anti-blur performance. The contrast along the edge is enhanced, the integrity of the image contours can therefore be retained, and the detailed image information will be well-maintained.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of anti-aliasing of an image with super-resolution comprising the steps of:
    (1) adopting a Canny edge detection to detect edges of an image and saving the edges as an original edge pixel frame, which comprises the steps of: smoothing the image edges by using a Gaussian filter; calculating a gradient magnitude and a gradient direction of the edges by applying a first-order partial derivative of the finite difference; adopting an non-maxima suppression to the gradient magnitude of the edges; and applying a dual-threshold algorithm to detect and connect the edges;
    (2) enlarging the original edge pixel frame to form a 2×2 enlarged pixel frame, retaining all information of edge pixels of the original edge pixel frame, additional pixels of the enlarged pixel frame caused by the enlargement are pixels to be interpolated;
    (3) replacing the pixels to be interpolated with a zero grayscale; and
    (4) compensating the pixels to be interpolated which are temporarily replaced by the zero grayscale along edge directions of the retained original edge pixels in the enlarged pixel frame, which comprises the steps of: dividing the edge pixels detected on the basis of the step (1) into a plurality of 4×4 pixels, and determining whether there is a special edge within the 4×4 pixel, if so, applying a corresponding 4×4 interpolation rule to calculate, and if not, determining whether there is a 2×2 universal edge within the 4×4 pixel, if so, applying a 2×2 common interpolation rule to compensate the zero grayscale pixels, if the above two edges do not exist, then applying a double-cubic interpolation algorithm to compensate the interpolation of the zero grayscale pixels; wherein
    the 4×4 interpolation rule is configured to determine an edge direction of the 4×4 pixel, and interpolating along the edge direction based on a center point of the 4×4 pixel, the interpolations of a top point and a left point of the center point are simultaneously compensated;
    the 2×2 common interpolation rule is for determining the edge direction of only four pixel points in the center of the 4×4 pixel, and interpolating along the edge direction based on the center point of the 4×4 pixel, the interpolations of the top point and the left point of the center point are simultaneously compensated;
    the compensation for interpolating of the center point of the 4×4 pixel, the top point, and the left point of the center point are determined by the four pixel points in the center of the 4×4 pixel.

2. A method of anti-aliasing of an image with super-resolution comprising the steps of:
    (1) detecting edges of an image and saving the edges as an original edge pixel frame;
    (2) enlarging the original edge pixel frame to form a 2×2 enlarged pixel frame, retaining all the information of edge pixels of the original edge pixel frame, additional pixels of the enlarged pixel frame caused by the enlargement are pixels to be interpolated;
    (3) replacing the pixels to be interpolated with a zero grayscale;
    (4) compensating the pixels to be interpolated which are temporarily replaced by the zero grayscale along edge directions of the retained original edge pixels in the enlarged pixel frame; wherein
    the step (4) comprises: dividing the edge pixels detected on the basis of the step (1) into a plurality of 4×4 pixels, and determining whether there is a special edge within the 4×4 pixel, if so, applying a corresponding 4×4 interpolation rule to calculate, and if not, determining whether there is a 2×2 universal edge within the 4×4 pixel, if so, applying a 2×2 common interpolation rule to compensate the zero grayscale pixels, if the above two edges do not exist, then applying a double-cubic interpolation algorithm to compensate the interpolation of the zero grayscale pixels; wherein the special edge is defined where a center of the 4×4 pixels is surrounded by pixels with at least two different grayscale values.

3. The method as claimed in claim 2, wherein the step (1) comprises:
    (1-1) smoothing the image edges by using a Gaussian filter;
    (1-2) calculating a gradient magnitude and a gradient direction of the edges by applying a first-order partial derivative of the finite difference;
    (1-3) adopting an non-maxima suppression to the gradient amplitude of the edges; and
    (1-4) applying a dual-threshold algorithm to detect and connect the edges.

4. The method as claimed in claim 2, wherein the 4×4 interpolation rule is configured to determine an edge direction of the 4×4 pixel, the interpolations of top point and left point of the center point are simultaneously compensated.

5. The method as claimed in claim 4, wherein the compensation for interpolating of the center point of the 4×4 pixel, the top point and the left point of the center point are determined by the four pixel points in the center of the 4×4 pixel.

6. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (0, b), (a, b), (2a, b), (3a, b) are detected as edge pixel points, a pixel value of the center point of the 4×4 pixel is derived by bicubic interpolation of four pixel coordinates (0, a), (a, b), (2a, b), (3a, b), a pixel value of the left point of the center point is equal to that of the pixel coordinate (a, b), a pixel value of the top point of the center point is equal to an average pixel value of pixel coordinates (a, 2b), (2a, 2b); when pixel coordinates (0, 2b), (a, 2b), (2a, 2b), (3a, 2b) are detected as edge pixel points, a pixel value of the top point of the center point is derived by bicubic interpolation of the four pixel coordinates (0, 2b), (a, 2b), (2a, 2b), (3a, 2b), a pixel value of the left point of the center point is equal to that of the pixel coordinate (a, b), a pixel value of the center point of the 4×4 pixel is equal to an average pixel value of the pixel coordinates (a,b), (2a, b), where a represents a unit length in a direction of the X-axis, b represents a unit length in a direction of the Y-axis.

7. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (0, b), (a, b), (2a, 2b), (3a, 2b), and (0, 2b), (a, 2b), (2a, b), (3a, b) are respectively detected as edge pixel points, a pixel value of the center point of the 4×4 pixel is equal to an average pixel value of the pixel coordinates (a, b), (2a, b), a pixel value of the left point of the center point is equal to that of the pixel coordinate (a, 2b), a pixel value of the top point of the center point is equal to that of the pixel coordinates (2a, 2b) and (a, 2b) respectively, where a represents a unit length in a direction of the X-axis, b represents a unit length in a direction of the Y-axis.

8. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (0, 0), (a, b), (2a, b), (3a, 2b); (0, b), (a, 2b), (2a, 2b), (3a, 3b); (0, 2b), (a, b), (2a, b), (3a,0); and (0, 3b), (a, 2b), (2a, 2b), (3a, b) are respectively detected as edge pixel points, a pixel value of the center point of the 4×4 pixel is equal to an average pixel value of the pixel coordinates (a, b), (2a, b), a pixel value of the left point of the center point is equal to an average pixel value of the pixel coordinate (a, 2b), (a, b), a pixel value of the top point of the center point is equal to an average pixel value of the pixel coordinates (a, 2b), (2a, 2b), where a represents a unit length in a direction of the X-axis, b represents a unit length in a direction of the Y-axis.

9. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (0, 0), (a, b), (2a, 2b), (3a, 3b) and (0, 3b), (a, 2b), (2a, b), (3a, 0) are respectively detected as edge pixel points, a pixel value of the left point of the center point is equal to an average pixel value of the pixel coordinates (a, 2b), (a, b), a pixel value of the top point of the center point is equal to an average pixel value of the pixel coordinate (a, 2b), (2a, 2b), a pixel value of the center points of the 4×4 pixel is derived by bicubic interpolation of four pixel coordinates (0, 0), (a, b), (2a, 2b), (3a, 3b) and (0, 3b), (a, 2b), (2a, b), (3a, 0) respectively, where a represents a unit length in a direction of the X-axis, b represents a unit length in a direction of the Y-axis.

10. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (a, 0), (2a, b), (2a, 2b), (3a, 3b) and (0, 3b), (a, 2b), (a, b), (2a, 0) are respectively detected as edge pixel points, a pixel value of the center point of the 4×4 pixel and the left point of the center point is equal to an average pixel value of the pixel coordinates (a, 2b), (a, b), a pixel value of the top point of the center point is equal to that of the pixel coordinate (a, 2b), wherein a represents a unit length in a direction of the X-axis, b represents a unit length in a direction of the Y-axis.

11. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (2a, 3b), (2a, 2b), (2a, b), (2a, 0) are detected as edge pixel points, a pixel value of the center point of the 4×4 pixel is derived by bicubic interpolation of four pixel coordinates (2a, 3b), (2a, 2b), (2a, b), (2a, 0), a pixel value of the left point of the center point is equal to an average pixel value of pixel coordinates (a, 2b), (a, b), a pixel value of the top point of the center point is equal to that of the pixel coordinate (a, 2b); when pixel coordinates (a, 3b), (a, 2b), (a, b), (a, 0) are detected as edge pixel points, a pixel value of the left point of the center point is derived by bicubic interpolation of four pixel coordinates (a, 3b), (a, 2b), (a, b), (a, 0), a pixel value of the center point of the 4×4 pixel is equal to an average pixel value of the pixel coordinates (a, 2b), (a, b), a pixel value of the top point of the center is equal to that of the pixel coordinate (a, 2b), where a represents a unit length in a direction of the X-axis, b represents a unit length in a direction of the Y-axis.

12. The method as claimed in claim 5, wherein a pixel coordinate of a pixel located in lower left corner of the 4×4 pixel is defined as (0, 0), and a pixel coordinate of a pixel located in upper right corner is defined as (3a, 3b), when pixel coordinates (a, 3b), (a, 2b), (2a, b), (2a, 0) and (2a, 3b), (2a, 2b), (a, b), (a, 0) are respectively detected as edge pixel points, a pixel value of the center point of the 4×4 pixel and the left point of the center point is equal to an average pixel value of the pixel coordinates (a, 2b), (a, b), a pixel value of the top point of the center point is equal to that of the pixel coordinate (a, 2b), where a represents a unit length in a direction of the X-axis, b represents a unit length in a direction of the Y-axis.

13. The method as claimed in claim 2, wherein the 2×2 common interpolation rule is for determining the edge direction of only four pixel points in the center of the 4×4 pixel, and interpolating along the edge direction based on the center point of the 4×4 pixel, the interpolations of the top point and the left point of the center point are simultaneously compensated.

14. The method as claimed in claim 13, wherein the compensation for interpolating of the center point of the 4×4 pixel, the top point and the left point of the center point are determined by the four pixel points in the center of the 4×4 pixel.

15. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinate (2a, b) is detected as edge pixel point, a pixel value of the center point of the 4×4 pixel and the left point of the center point is equal to an average pixel value of pixel coordinates (a, 2b), (a, b), a pixel value of the top point of the center point is equal to an average pixel value of pixel coordinates (a, 2b), (2a, 2b), where a represents a unit length in a direction of the X-axis, b represents a unit length in a direction of the Y-axis.

16. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinate (a, b) is detected as edge pixel point, a pixel value of the center point of the 4×4 pixel is equal to an average pixel value of pixel coordinates (2a, 2b), (2a, b), a pixel value of the left point of the center point is equal to that of pixel coordinate (a, 2b), a pixel value of the top point of the center point is equal to an average pixel value of the pixel coordinates (a, 2b), (2a, 2b), where a represents a unit length in a direction of the X-axis, b represents a unit length in a direction of the Y-axis.

17. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, b), (2a, b) are detected as edge pixel points, a pixel value of the center point of the 4×4 pixel is equal to an average pixel value of the pixel coordinates (a, b), (2a, b), a pixel value of the left point of the center point is equal to that of the pixel coordinate (a, b), a pixel value of the top point of the center point is equal to an average pixel value of pixel coordinates (a, 2b), (2a, 2b), where a represents a unit length in a direction of the X-axis, b represents a unit length in a direction of the Y-axis.

18. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinate (2a, 2b) is detected as edge pixel point, a pixel value of the center point of the 4×4 pixel is equal to an average pixel value of pixel coordinates (a, b), (2a, b), a pixel value of the left point of the center point is equal to that of the pixel coordinate (a, b), the top point of the center point is equal to that of pixel coordinate (a, 2b), where a represents a unit length in a direction of the X-axis, b represents a unit length in a direction of the Y-axis.

19. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (2a, 2b), (2a, b) are detected as edge pixel points, a pixel value of the center point of the 4×4 pixel and the left point of the center point is equal to an average pixel value of pixel coordinates (a, 2b), (a, b), a pixel value of the top point of the center point is equal to that of the pixel coordinate (a, 2b), where a represents a unit length in a direction of the X-axis, b represents a unit length in a direction of the Y-axis.

20. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (2a, 2b), (a, b) or (2a, b), (a, b), (2a, b) are detected as edge pixel points, a pixel value of the center point of the 4×4 pixel is equal to an average pixel value of the pixel coordinates (a, b), (2a, 2b), a pixel value of the left point and the top point of the center point is equal to that of pixel coordinate (a, 2b), where a represents a unit length in a direction of the X-axis, b represents a unit length in a direction of the Y-axis.

21. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinate (a, 2b) is detected as edge pixel point, a pixel value of the center point of the 4×4 pixel is equal to an average pixel value of pixel coordinates (a, b), (2a, b), a pixel value of the left point of the center point is equal to that of the pixel coordinate (a, b), a pixel value of the top point of the center point is equal to that of pixel coordinate (2a, 2b), where a represents a unit length in a direction of the X-axis, b represents a unit length in a direction of the Y-axis.

22. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (2a, b) are detected as edge pixel points, a pixel value of the center point of the 4×4 pixel is equal to an average pixel value of the pixel coordinates (a, 2b), (2a, b), a pixel value of the left point of the center point is equal to that of pixel coordinate (a, b), a pixel value of the top point of the center point is equal to that of pixel coordinate (2a, 2b), where a represents a unit length in a direction of the X-axis, b represents a unit length in a direction of the Y-axis.

23. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (a, b) are detected as edge pixel points, a pixel value of the center point of the 4×4 pixel is equal to an average pixel value of pixel coordinates (2a, 2b), (2a, b), a pixel value of the left point of the center point is equal to an average pixel value of the pixel coordinates (a, 2b), (a, b), a pixel value of the top point of the center point is equal to that of the pixel coordinate (2a, 2b), where a represents a unit length in a direction of the X-axis, b represents a unit length in a direction of the Y-axis.

24. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (a, b), (2a, b) are detected as edge pixel points, a pixel value of the center point of the 4×4 pixel is equal to an average pixel value of the pixel coordinates (a, 2b), (2a, b), a pixel value of the left point of the center point is equal to an average pixel value of the pixel coordinates (a, 2b), (a, b), a pixel value of the top point of the center point is equal to that of pixel coordinate (2a, 2b), where a represents a unit length in a direction of the X-axis, b represents a unit length in a direction of the Y-axis.

25. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (2a, 2b) are detected as edge pixel points, a pixel value of the center point of the 4×4 pixel is equal to an average pixel value of pixel coordinates (a, b), (2a, b), a pixel value of the left point of the center point is equal to that of the pixel coordinate (a, b), a pixel value of the top point of the center point is equal to an average pixel value of the pixel coordinates (a, 2b), (2a, 2b), where a represents a unit length in a direction of the X-axis, b represents a unit length in a direction of the Y-axis.

26. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (2a, 2b), (2a, b) are detected as edge pixel points, a pixel value of the center point of the 4×4 pixel is equal to an average pixel value of the pixel coordinates (a, 2b), (2a, b), a pixel value of the left point of the center point is equal to that of pixel coordinate (a, b), a pixel value of the top point of the center point is equal to an average pixel value of the pixel coordinates (a, 2b), (2a, 2b), where a represents a unit length in a direction of the X-axis, b represents a unit length in a direction of the Y-axis.

27. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (2a, 2b), (a, b) are detected as edge pixel points, a pixel value of the center point of the 4×4 pixel is equal to an average pixel value of the pixel coordinates (2a, 2 b), (a, b), a pixel value of the left point of the center point is equal to an average pixel value of the pixel coordinates (a, 2b), (a, b), a pixel value of the top point of the center point is equal to an average pixel value of the pixel coordinates (a, 2b), (2a, 2b), where a represents a unit length in a direction of the X-axis, b represents a unit length in a direction of the Y-axis.

28. The method as claimed in claim 14, wherein a pixel coordinate of a pixel located in lower left corner of the 4×4 pixel is defined as (0, 0), and a pixel coordinate of a pixel located in upper right corner is defined as (3a, 3b), when pixel coordinates (a, 2b), (2a, 2b), (a, b), (2a, b) are detected as edge pixel points, a pixel value of the center point of the 4×4 pixel is equal to an average pixel value of the pixel coordinates (a, 2b), (2a, 2b), (a, b), (2a, b), a pixel value of the left point of the center point is equal to an average pixel value of the pixel coordinates (a, 2b), (a, b), a pixel value of the top point of the center point is equal to an average pixel value of the pixel coordinates (a, 2b), (2a, 2b), where a represents a unit length in a direction of the X-axis, b represents a unit length in a direction of the Y-axis.

\* \* \* \* \*